(12) United States Patent
Ponnarasu et al.

(10) Patent No.: US 10,303,299 B2
(45) Date of Patent: May 28, 2019

(54) USE OF GROOVE ANALYSIS IN A TOUCH SCREEN DEVICE TO DETERMINE OCCURRENCE OF AN ELONGATED TOUCH BY A SINGLE FINGER

(71) Applicant: STMicroelectronics Asia Pacific Pte Ltd, Singapore (SG)

(72) Inventors: Manivannan Ponnarasu, Singapore (SG); Mythreyi Nagarajan, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 75 days.

(21) Appl. No.: 15/397,340

(22) Filed: Jan. 3, 2017

(65) Prior Publication Data

US 2018/0188878 A1   Jul. 5, 2018

(51) Int. Cl.
*G06F 3/041*   (2006.01)

(52) U.S. Cl.
CPC .................. *G06F 3/0418* (2013.01)

(58) Field of Classification Search
CPC ..................................................... G06F 3/0488
See application file for complete search history.

(56) References Cited

U.S. PATENT DOCUMENTS

| | | | | |
|---|---|---|---|---|
| 8,553,003 B2* | 10/2013 | Hashimoto | ........... | G06F 3/0416 345/156 |
| 8,907,908 B2* | 12/2014 | Chao | ..................... | G06F 3/0416 178/18.01 |
| 9,069,460 B2* | 6/2015 | Moore | ................ | G06F 3/04883 |
| 9,471,186 B2* | 10/2016 | Huang | .................... | G06F 3/044 |
| 9,569,045 B2* | 2/2017 | Westerman | ............. | G06F 3/044 |
| 9,798,428 B2* | 10/2017 | Dai | ......................... | G06F 3/044 |
| 2009/0187375 A1* | 7/2009 | Kinoshita | .............. | G01B 7/008 702/158 |
| 2009/0284495 A1* | 11/2009 | Geaghan | ............... | G06F 3/0416 345/174 |
| 2010/0097328 A1* | 4/2010 | Simmons | .............. | G06F 3/0416 345/173 |
| 2010/0117962 A1* | 5/2010 | Westerman | ......... | G06F 3/03543 345/163 |
| 2010/0295810 A1* | 11/2010 | Nagata | .................. | G06F 3/0416 345/173 |
| 2012/0032891 A1* | 2/2012 | Parivar | ............... | G06F 3/04883 345/173 |
| 2013/0016045 A1* | 1/2013 | Zhao | ..................... | G06F 3/0416 345/173 |

(Continued)

*Primary Examiner* — Kent W Chang
*Assistant Examiner* — Nathaniel P Brittingham
(74) *Attorney, Agent, or Firm* — Crowe & Dunlevy

(57) ABSTRACT

Disclosed herein is a touch screen controller operable with a touch screen. The touch screen controller includes input circuitry configured to receive touch data from the touch screen, and processing circuitry. The processing circuitry is configured to identify an island in the touch data, determine whether a horizontal groove is present in the island, determine whether a vertical groove is present in the island, and determine whether a diagonal groove is present in the island. The processing circuitry determines the island to indicate a single elongated touch where a diagonal groove is present in the island but horizontal and vertical grooves are not present in the island.

16 Claims, 3 Drawing Sheets

(56) References Cited

U.S. PATENT DOCUMENTS

| | | | |
|---|---|---|---|
| 2013/0106732 A1* | 5/2013 | Chao | G06F 3/0416 345/173 |
| 2013/0169561 A1* | 7/2013 | Park | G06F 3/0488 345/173 |
| 2014/0035859 A1* | 2/2014 | Wilson | G01R 27/26 345/174 |
| 2014/0118287 A1* | 5/2014 | Miyamoto | G06F 3/044 345/173 |
| 2014/0152602 A1* | 6/2014 | Miyamoto | G06F 3/0416 345/173 |
| 2015/0378497 A1* | 12/2015 | Ningrat | G06F 3/044 345/174 |

\* cited by examiner

| 113 | 595 | 435 | 0 | -140 | -282 | -231 | | 490 |
|---|---|---|---|---|---|---|---|---|
| 196 | 641 | 652 | 175 | -188 | -391 | -301 | | 784 |
| 40 | 322 | 463 | 112 | -73 | -150 | -145 | | 569 |
| -50 | 208 | -189 | -39 | 233 | 605 | 302 | | 654 |
| -222 | 444 | -429 | -166 | 301 | 593 | 559 | | 192 |
| -46 | -181 | -171 | -31 | 119 | 452 | 310 | | 452 |

| 31 | 725 | 761 | 51 | 252 | 827 | 494 |
|---|---|---|---|---|---|---|

FIG. 3

| 45 | 383 | 487 | -14 | 296 | -154 | | 451 |
|---|---|---|---|---|---|---|---|
| 255 | 558 | 421 | 348 | -154 | -146 | | 1282 |
| 196 | 455 | 295 | 273 | 291 | -102 | | 1408 |
| -97 | 190 | 260 | 245 | 449 | 169 | | 1216 |
| -158 | -348 | -82 | 395 | 629 | 271 | | 707 |

| 241 | 1238 | 1381 | 1247 | 919 | 38 |
|---|---|---|---|---|---|

FIG. 4

USE OF GROOVE ANALYSIS IN A TOUCH SCREEN DEVICE TO DETERMINE OCCURRENCE OF AN ELONGATED TOUCH BY A SINGLE FINGER

TECHNICAL FIELD

This application is directed to the field of finger sensing, and, more particularly, to the use of groove analysis to determine whether a received touch input is an elongated touch by a single finger.

BACKGROUND

Touch screens are prevalent in today's computing environment. Portable computers, desktop computers, tablets, smart phones, and smartwatches employ a touch screen to gain user input for navigation and control of these devices. Thus, discerning the intent of the user via touch inputs becomes an important feature of a touch screen device. Further, distinguishing actual touches to the touch screen by the user from noise and other non-input detections is also important for delivering meaningful communication of the user's intent through touches to the touch screen.

Typically, an input to a touch screen (e.g., a touch) is initiated by the user by placing a finger on the touch screen, which causes the touch screen to generate a variety of signals to identify the location of the touch on the touch screen. Further, sometimes two or more touches are intended simultaneously so as to convey the intent for a specific navigation command, such as a reverse pinch to zoom within an application that is currently running, a pinch to zoom out within an application, or a swipe with multiple fingers to close the application altogether. Thus, deciphering the intent of the user when simultaneous touches are received is an important feature of any touch screen device.

However, conventional touch screen interpretation techniques may interpret an elongated touch by a single finger as two close finger touches, resulting in incorrect operation by the electronic device utilizing the touch screen for input. Since this is clearly undesirable, further development in touch screen interpretation techniques is needed, particularly in the area of how to interpret elongated touches by a single finger.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a touch screen controller operable with a touch screen. The touch screen controller includes input circuitry configured to receive touch data from the touch screen, and processing circuitry. The processing circuitry is configured to identify an island in the touch data, determine whether a horizontal groove is present in the island, determine whether a vertical groove is present in the island, and determine whether a diagonal groove is present in the island. The processing circuitry determines the island to indicate a single elongated touch where a diagonal groove is present in the island but horizontal and vertical grooves are not present in the island.

The processing circuitry may determine the island to be a single non-elongated touch where horizontal, vertical, and diagonal grooves are not present in the touch data.

The processing circuitry may determine the island to be two single and separated touches where a horizontal or vertical groove is present in the touch data.

The island may be a matrix of strength values acquired from adjacent locations of the touch screen that indicate a potential touch by being above a base strength threshold.

The processing circuitry may determine whether the horizontal groove is present by summing strength values along each horizontal axis of the matrix of strength values to produce a plurality of horizontal sums, and determining whether one of the plurality of horizontal sums is substantially less than its neighbors.

The processing circuitry may determine whether the vertical groove is present by summing strength values along each vertical axis of the matrix of strength values to produce a plurality of vertical sums, and determining whether one of the plurality of vertical sums is substantially less than its neighbors.

The processing circuitry may determine whether a diagonal groove is present by identifying a strength value that is substantially less than immediately adjacent strength values in the matrix of strength values in a first diagonal direction.

The processing circuitry may determine whether a diagonal groove is present by identifying a strength value that is substantially less than immediately adjacent strength values in the matrix of strength values in a second diagonal direction different than a first diagonal direction.

The processing circuitry may determine whether a horizontal groove is present by identifying a strength value that is substantially less than adjacent strength values in the matrix of strength values along a horizontal axis thereof.

The processing circuitry may determine whether a vertical groove is present by identifying a strength value that is substantially less than adjacent strength values in the matrix of strength values along a vertical axis thereof.

A method aspect includes receiving touch data from a touch screen, and identifying an island in the touch data. The island is determined to indicate a single elongated touch where a diagonal groove is present in the island but a horizontal groove is not present in sums of strength values of the island along its horizontal axes and a vertical groove is not present in sums of strength values of the island along its vertical axes.

BRIEF DESCRIPTION OF THE DRAWINGS

FIG. 3 is a matrix showing strength values of a touch island representing a multi-touch input.

FIG. 4 is a matrix showing strength values of a touch island representing a single elongated touch.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein is related to a touch screen device having a tactile input surface suited to detect more than one tactile input (e.g., finger touch) at a time. To further distinguish between two different tactile inputs, (e.g., a multi-touch) the touch screen device may include a touch screen controller that includes an analysis circuit or processing circuitry. Generally speaking, when a touch input is received at the surface of a touch screen device, the touch screen may register touch strength signals at each of a plurality of touch regions. The touch strength signals will be largest at the epicenter of the actual touch inputs and will fall off in adjacent touch regions therefrom. By analyzing the touch strength signals at every touch region relative to touch signal strengths at touch regions adjacent to the touch region under analysis, the touch screen controller may be able to determine "grooves" or separations between touch inputs. A groove may be generally defined as a touch region that exhibits a touch strength signal that is less than surrounding touch regions.

Through analyzing the locations and orientations of these grooves, further information about the touch input may be determined. For example, a total number of touches may be determined. These and other aspects of the embodiments described herein are discussed in greater detail with respect to FIGS. 1-4.

Figure 1:
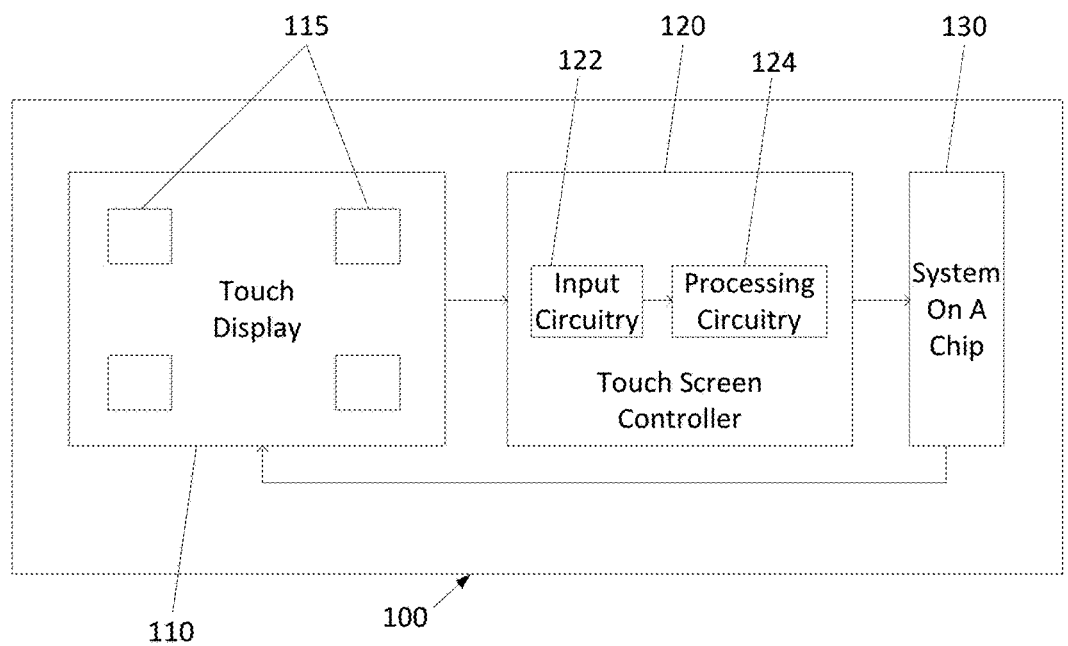
FIG. 1 is a block diagram of a touch screen device in accordance with this disclosure.

FIG. 1 is a functional block diagram of a touch screen device 100 according to an embodiment as disclosed herein. The touch screen device 100 may be a smartphone, tablet, portable computer, smartwatch, wearable, or other device. The touch screen device 100 includes a tactile input surface, such as a touch display 110 coupled to a touch controller 120. The touch screen display 110 is designed to receive touch inputs from a user through a user's fingers. The touch screen display 110 includes touch screen sensors 115 that are configured to detect touches (or other input actions such as hover or gesture motions) to the touch screen display 110. As a touch is sensed, the touch screen controller 120 may receive touch signals from the sensors 115 and analyze the touch signal(s). This interpretation may then be used by a system on a chip (SOC) 130 to manipulate operations respect to applications and programs executing on the touch screen device 100.

In one embodiment, the sensors 115 may be a single type of sensing technology or sensor, such as self-capacitance sensors or mutual capacitance sensors, to be utilized in the touch screen device 100 to detect input events. In some cases, the same sensors 115 may be used for both self-capacitance sensing and mutual capacitance sensing.

Where the sensors 115 are capacitive sensors, the sensors 115 are typically formed as an array of sensors from transparent patterned orthogonal conductive lines (not shown) formed on the surface, or integrated as part of, the touch display 110. The intersections of the conductive lines form the individual touch sensors 115, and the touch screen controller 120 scans these sensing points and processes the generated signals to identify the location and type of a touch point or points. Thus, the touch screen display 110 may be considered as a touch map having XY coordinates wherein several touch regions (as defined by a set of XY coordinates) of possible touch information may be generated based on one or more touches to the touch screen display 110. That is, each XY coordinate in the touch screen display 110 may have at least some touch strength signal generated at each touch with larger touch strength signals being generated closer to the source of the touch input. Therefore, the touch signals may be organized into a matrix of touch strength values.

As explained above, it is desirable to distinguish a multi-touch input from a single touch input. Conventional touch sensing technology has an issue, in some cases, of distinguishing between an event where a single finger, typically an index finger or thumb, performs an elongated touch, and an event where two fingers in close proximity perform two simultaneous or substantially simultaneous touches. By an elongated touch, it is meant that the contact area made between the finger and the touch screen display 110 is not generally circular, but is instead oblong, elliptical, or rectangular in nature. In addition, this contact area made during an elongated touch may be larger than the contact area made during a typical tap touch input.

Figure 2:
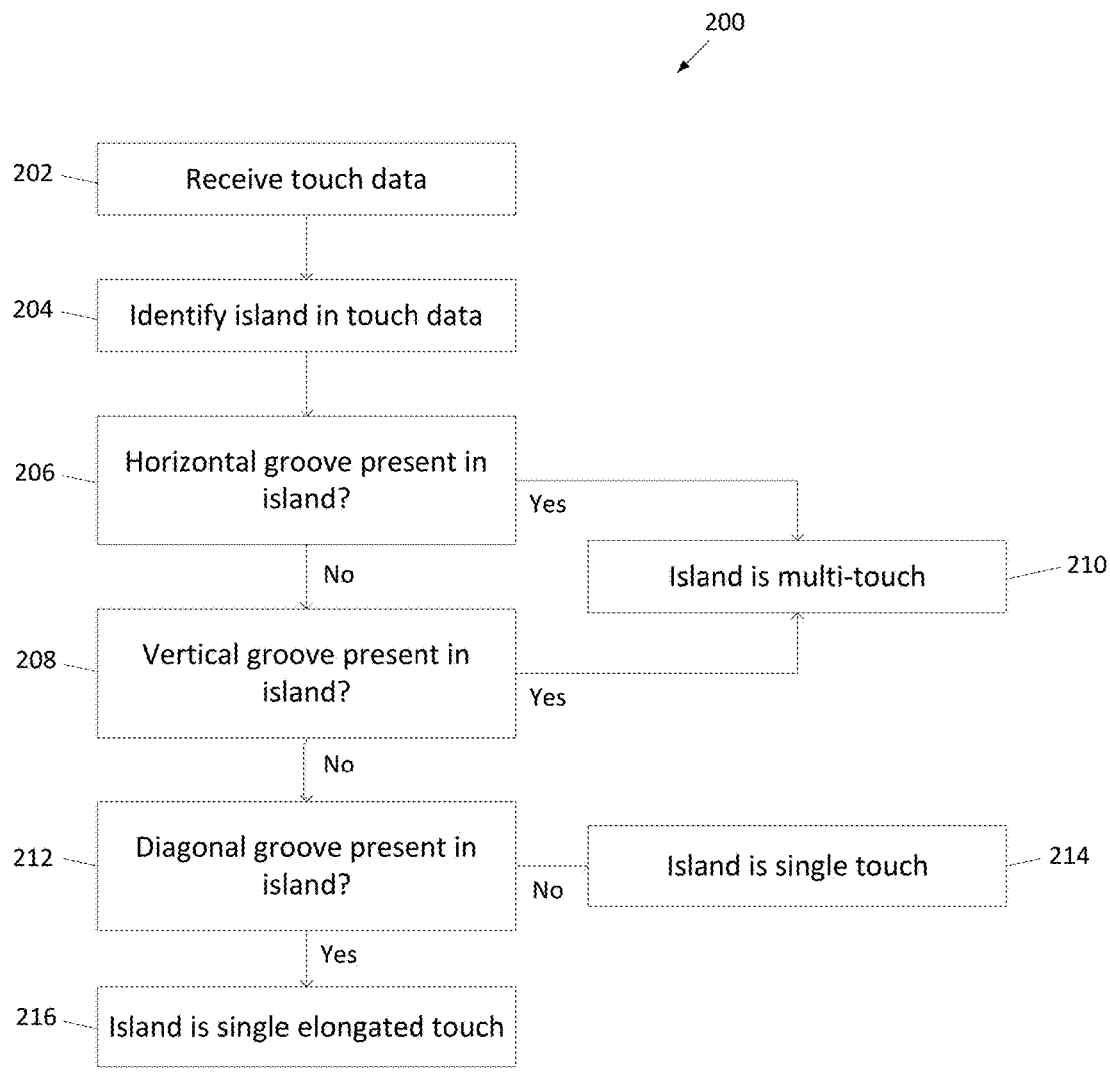
FIG. 2 is a flowchart of a method of operating the touch screen device of FIG. 1 in accordance with this disclosure.

Therefore, the Inventors have devised the following signal processing technique which will be described with additional reference to the flowchart 200 of FIG. 2. Touch data is received from the touch display 110 by input circuitry 122 of the touch screen controller 120 (Block 202). Processing circuitry 124 of the touch screen controller 120 then identifies an island in the touch data (Block 204). The touch island is comprised of strength values acquired from adjacent locations of the touch display 110 that indicate a potential touch by being above a base strength threshold. Sample matrices of strength values of a touch island are shown in FIGS. 3-4.

Thereafter, the processing circuitry 124 determines whether a horizontal groove is present in the island (Block 206). To determine whether a horizontal groove is present, the strength values along each horizontal axis are first summed. These sums are shown in the charts of FIGS. 3-4 in the rightmost columns thereof. A horizontal groove is indicated by a sum that is substantially less than, or less than, its neighbors. Optionally, a tolerance value may be added to the given sum under comparison, but not to the other sums it is being compared to. For example, this tolerance value may be 25 or 50.

For example, of the horizontal sums shown in FIG. 3, the strength value of 569 is less than its neighbors of 784 and 654. Therefore, the sum of 569 in FIG. 3 indicates the presence of a horizontal groove. Likewise, of the horizontal sums shown in FIG. 3, the strength value of 192 is less than its neighbors of 654 and 452. Therefore, the sum of 192 in FIG. 3 indicates the presence of a horizontal groove.

Thereafter, the processing circuitry 124 determines whether a vertical groove is present in the island (Block 208). To determine whether a vertical groove is present, the strength values along each vertical axis are summed. These sums are shown in the charts of FIGS. 3-4 in the bottommost columns thereof. A vertical groove is indicated by a sum that is substantially less than, or less than, its neighbors. Optionally, a tolerance value may be added to the given sum under comparison, but not to the other sums it is being compared to. For example, this tolerance value may be 25 or 50.

For example, of the vertical sums shown in FIG. 3, the strength value of 51 is less than its neighbors of 761 and 252. Therefore, the sum of 51 in FIG. 3 indicates the presence of a vertical groove.

Where a horizontal groove or vertical groove is found to be present in the touch island, the processing circuitry 124 then determines the island to represent a multi-touch input (Block 210).

If neither a horizontal groove nor a vertical groove is found by the processing circuitry 124, the processing circuitry 124 determines whether a diagonal groove is present in the island (Block 212). If a diagonal groove is found to be present, where neither a horizontal groove nor a vertical groove was found, the processing circuitry 124 determines the island to represent a single elongated touch (Block 216). If no diagonal groove is found to be present, and neither a horizontal groove nor a vertical groove was found, the processing circuitry 124 determines the island to represent a single non-elongated touch (Block 214).

Rather than comparing sums to determine grooves, each strength value of the island, or each interior strength value (meaning, not being one of the topmost, bottommost, leftmost, or rightmost values in the matrix), is compared to its immediate neighbors in a first diagonal direction, and in a second diagonal direction. Where a strength value is substantially less than, or less than, its immediate neighbors in at least one diagonal direction, then a diagonal groove has been located.

Optionally, a tolerance value may be added to the given strength value under comparison, but not to the other strength values it is being compared to. For example, this tolerance value may be 25 or 50.

An example of an elongated single touch is shown in FIG. 4. Here, as can be seen, no grooves are to be found in the horizontal sums, and no grooves are to be found in the vertical sums. However, as can be seen, the value of 273 has diagonal neighbors (along the upper left to lower right diagonal) of 421 and 449, meaning that the value of 273 represents a diagonal groove. Likewise, the value of 260 has diagonal neighbors (also along the upper left to lower right diagonal) of 455 and 395, meaning that the value of 260 represents a diagonal groove.

Through the described technique, an elongated touch can be distinguished from two close but spaced apart touches.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

The invention claimed is:

1. A touch screen controller operable with a touch screen, the touch screen controller comprising:
   input circuitry configured to receive touch data from the touch screen; and
   processing circuitry configured to:
      identify an island in the touch data, wherein the island is comprised of a matrix of strength values acquired from adjacent locations of the touch screen that indicate a potential touch by being above a base strength threshold;
      determine whether a horizontal groove is present in the island by summing strength values along each horizontal axis of the matrix of strength values to produce a plurality of horizontal sums and determining whether one of the plurality of horizontal sums is substantially less than its neighbors;
      determine whether a vertical groove is present in the island;
      determine whether a diagonal groove is present in the island;
      determine the island to indicate a single elongated touch where a diagonal groove is present in the island but horizontal and vertical grooves are not present in the island.

2. The touch screen controller of claim 1, wherein the processing circuitry is further configured to determine the island to be a single non-elongated touch where horizontal, vertical, and diagonal grooves are not present in the touch data.

3. The touch screen controller of claim 1, wherein the processing circuitry is further configured to determine the island to be two single and separated touches where one of a horizontal or vertical groove is present in the touch data.

4. The touch screen controller of claim 1, wherein the processing circuitry determines whether the vertical groove is present by summing strength values along each vertical axis of the matrix of strength values to produce a plurality of vertical sums, and determining whether one of the plurality of vertical sums is substantially less than its neighbors.

5. The touch screen controller of claim 1, wherein the processing circuitry determines whether a diagonal groove is present by identifying a strength value that is substantially less than immediately adjacent strength values in the matrix of strength values in a first diagonal direction.

6. The touch screen controller of claim 1, wherein the processing circuitry determines whether a diagonal groove is present by identifying a strength value that is substantially less than immediately adjacent strength values in the matrix of strength values in a second diagonal direction different than a first diagonal direction.

7. The touch screen controller of claim 1, wherein the processing circuitry determines whether a horizontal groove is present by identifying a strength value that is substantially less than adjacent strength values in the matrix of strength values along a horizontal axis thereof.

8. The touch screen controller of claim 1, wherein the processing circuitry determines whether a vertical groove is present by identifying a strength value that is substantially less than adjacent strength values in the matrix of strength values along a vertical axis thereof.

9. A method, comprising:
   receiving touch data from a touch screen;
   identifying an island in the touch data, wherein the island is comprised of a matrix of strength values acquired from adjacent locations of the touch screen that indicate a potential touch by being above a base strength threshold;
   determining the island to indicate a single elongated touch where a diagonal groove is present in the island but a horizontal groove is not present in sums of strength values of the island along its horizontal axes and a vertical groove is not present in sums of strength values of the island along its vertical axes, wherein presence of a horizontal groove is determined by summing strength values along each horizontal axis of the matrix of strength values to produce a plurality of horizontal sums, and determining whether one of the plurality of horizontal sums is substantially less than its neighbors.

10. The method of claim 9, wherein the island is determined to be a single non-elongated touch where horizontal, vertical, and diagonal grooves are not present in the touch data.

11. The method of claim 9, wherein the island is determined to be two single and separated touches where a horizontal or vertical groove is present in the touch data.

12. The method of claim 9, wherein presence of a vertical groove is determined by summing strength values along each vertical axis of the matrix of strength values to produce a plurality of vertical sums, and determining whether one of the plurality of vertical sums is substantially less than its neighbors.

13. The method of claim 9, wherein presence of a diagonal groove is determined by identifying a strength value that is substantially less than immediately adjacent strength values in the matrix of strength values in a first diagonal direction.

14. The method of claim 13, wherein presence of the diagonal groove is determined by identifying a strength value that is substantially less than immediately adjacent strength values in the matrix of strength values in a second diagonal direction different than the first diagonal direction.

15. The method of claim 9, wherein presence of a horizontal groove is determined by identifying a strength value that is substantially less than adjacent strength values in the matrix of strength values along a horizontal axis thereof.

16. The method of claim 9, wherein presence of a vertical groove is determined by identifying a strength value that is substantially less than adjacent strength values in the matrix of strength values along a vertical axis thereof.

\* \* \* \* \*